Figure 1:
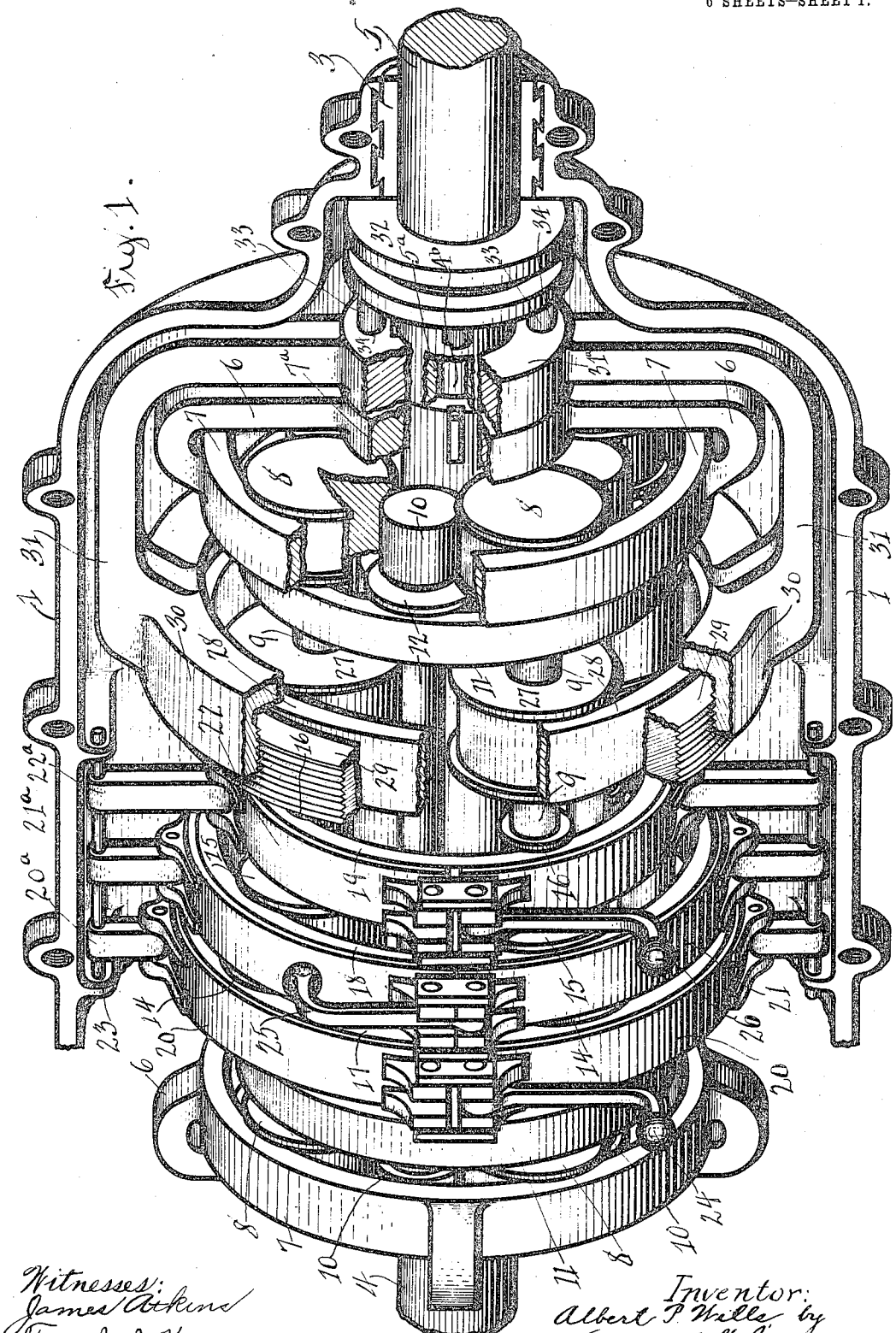

A. P. WILLS.
GEARING.
APPLICATION FILED JAN. 22, 1913.

1,081,642.

Patented Dec. 16, 1913.
6 SHEETS—SHEET 1.

Witnesses:
James Atkins
Frank A. Kane

Inventor:
Albert P. Wills by
Edmund H. Parry attorney

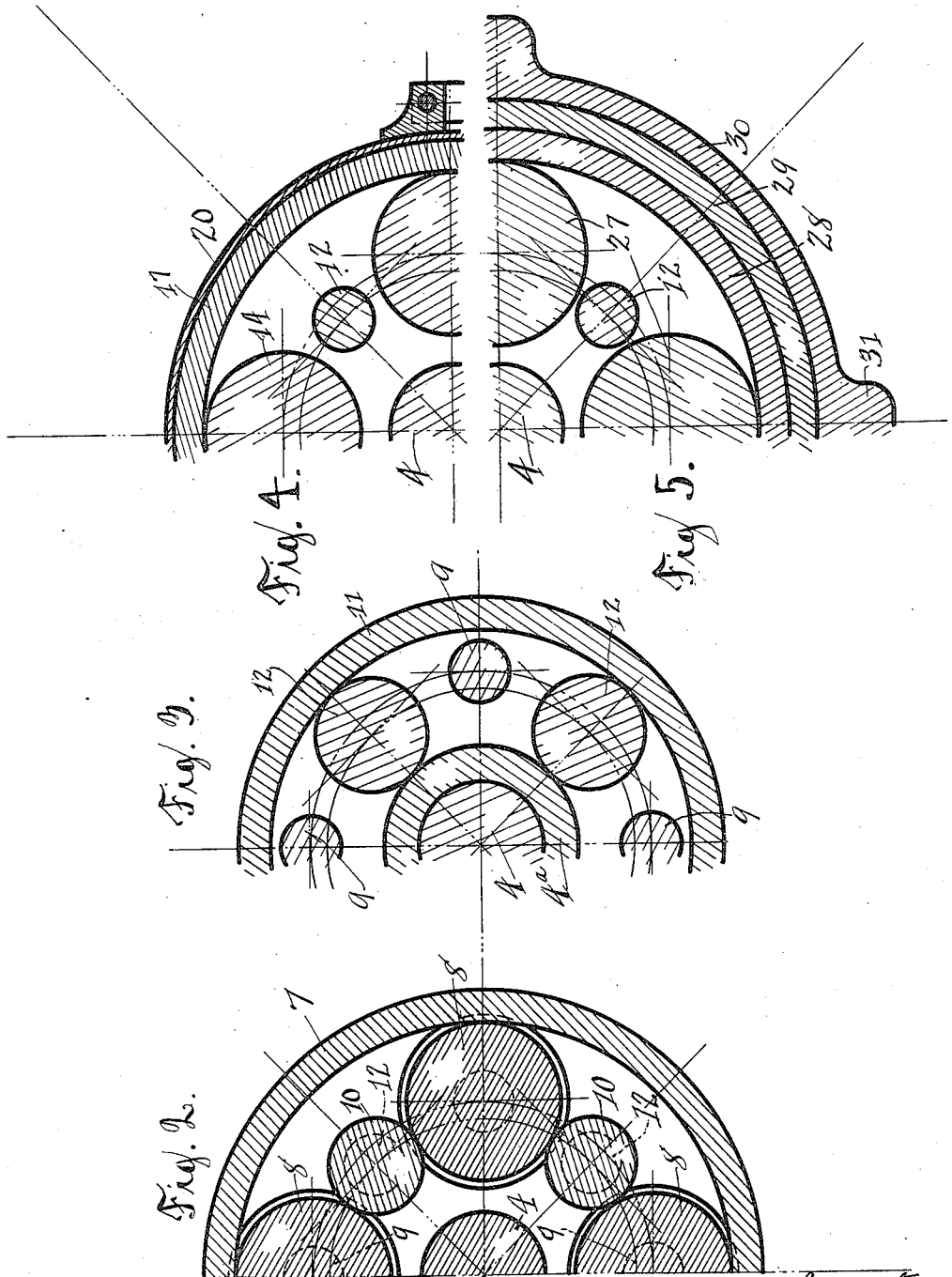

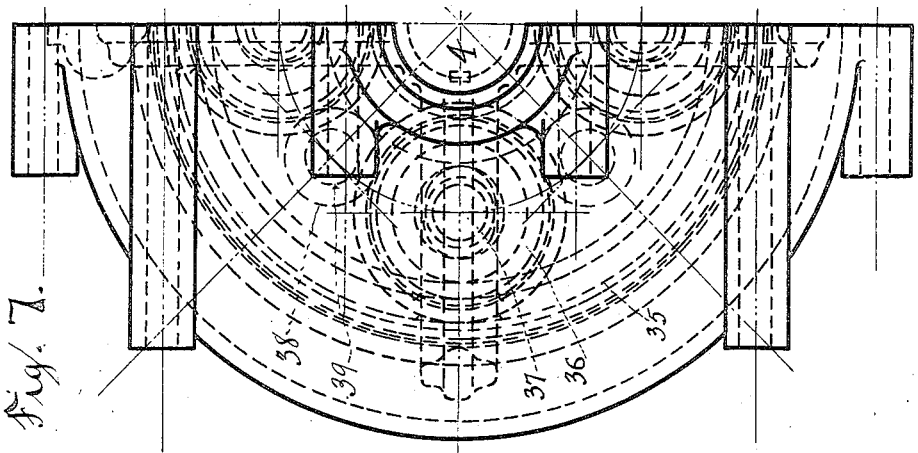
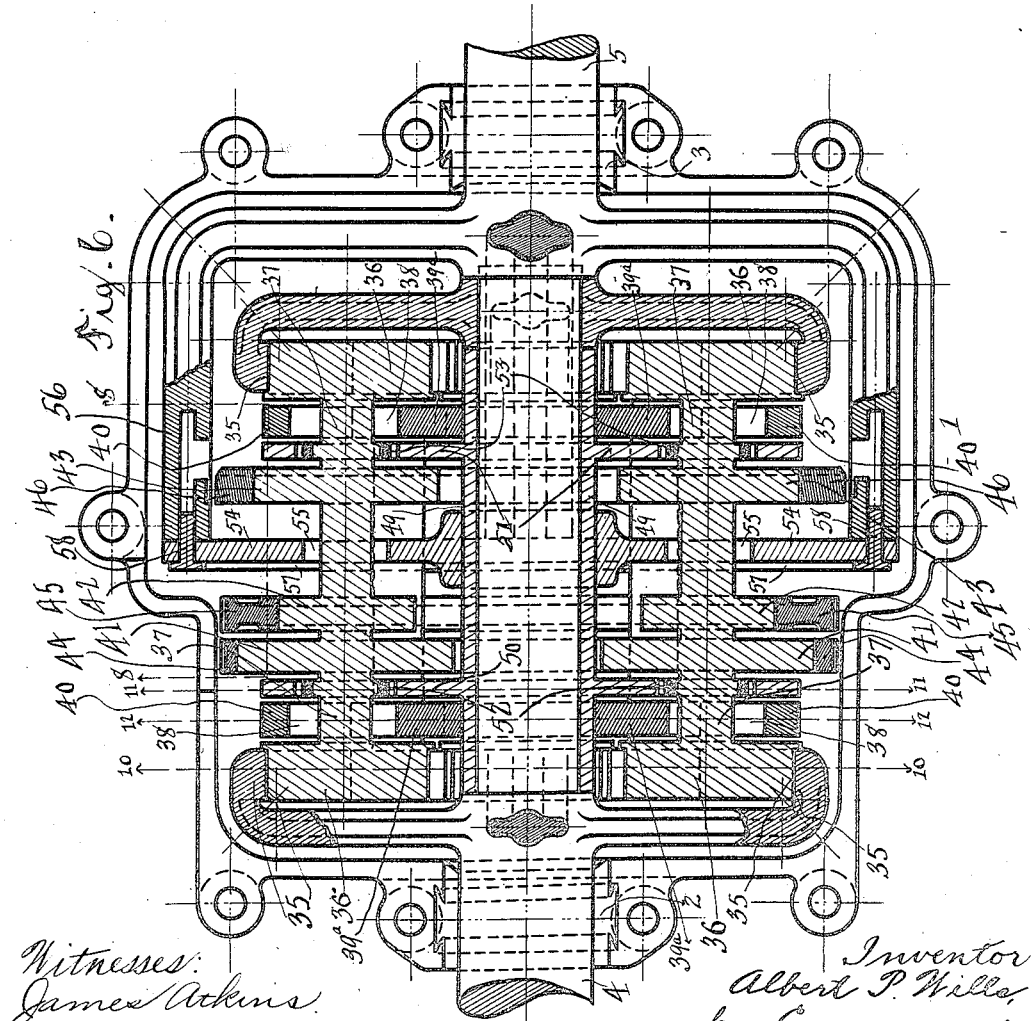

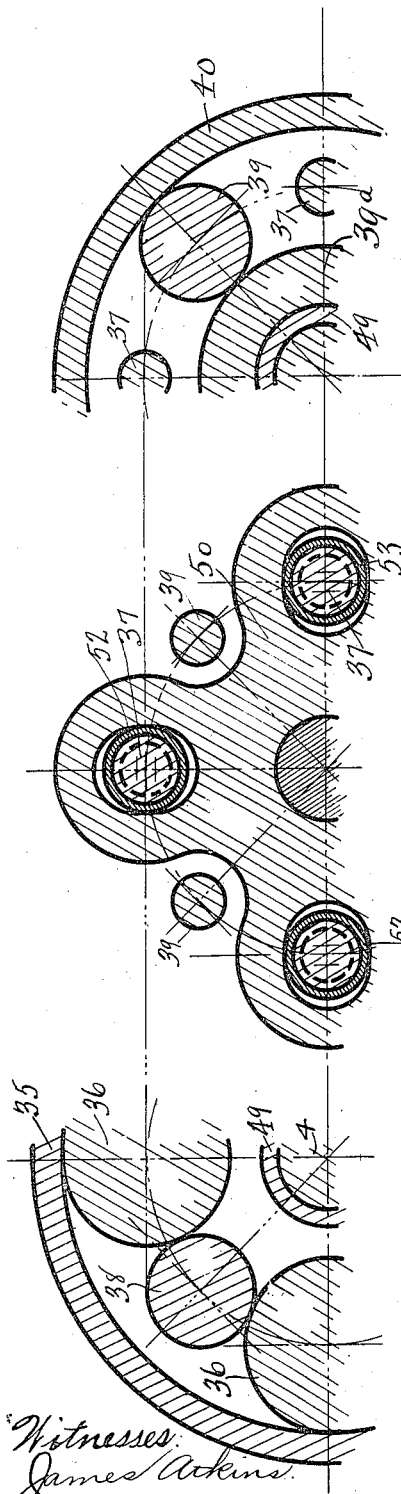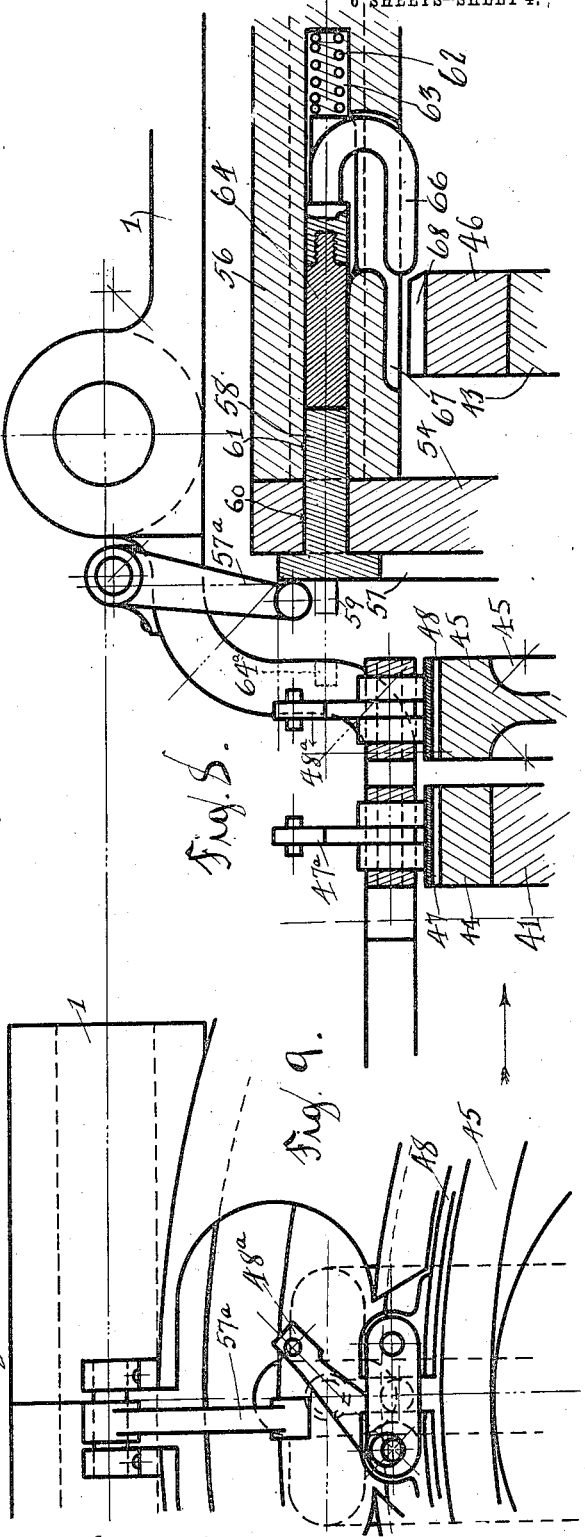

A. P. WILLS.
GEARING.
APPLICATION FILED JAN. 22, 1913.

1,081,642.

Patented Dec. 16, 1913.

6 SHEETS—SHEET 5.

Witnesses:
James Atkins
Frank A. Kane

Inventor:
Albert P. Wills,
by Edmund H. Parry, Attorney

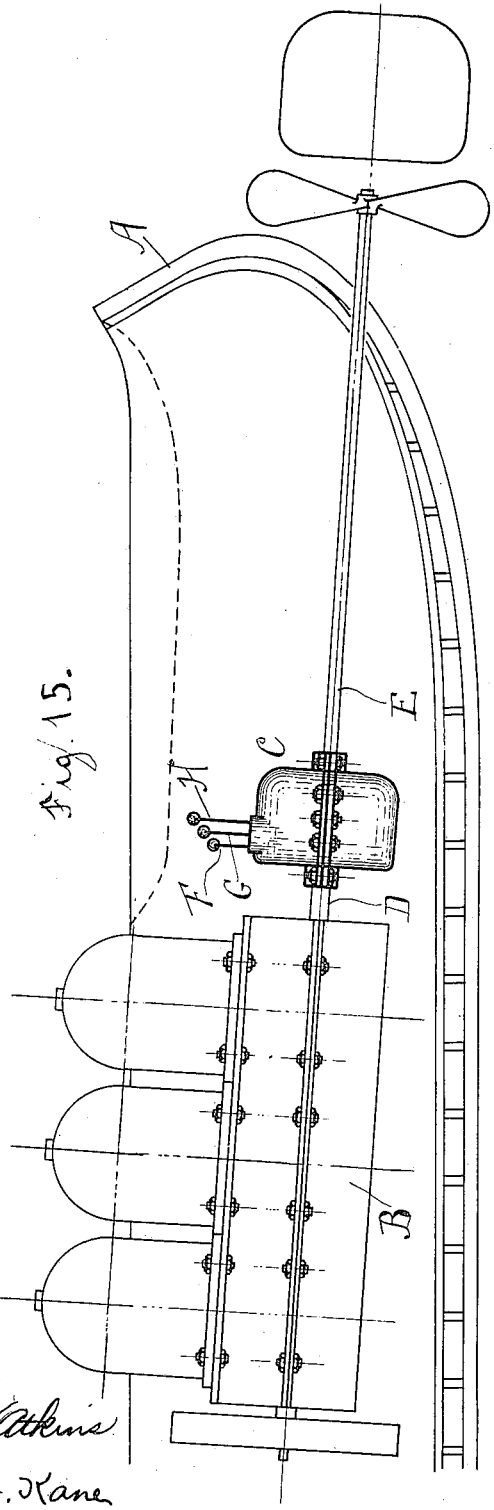

UNITED STATES PATENT OFFICE.

ALBERT P. WILLS, OF NEW YORK, N. Y.

GEARING.

1,081,642.

Specification of Letters Patent.   Patented Dec. 16, 1913.

Application filed January 22, 1913.   Serial No. 743,603.

*To all whom it may concern:*

Be it known that I, ALBERT P. WILLS, a citizen of the United States, residing at New York, in the county of New York and State of New York, have invented certain new and useful Improvements in Gearing, of which the following is a specification, reference being had therein to the accompanying drawing.

This invention relates to gearing and particularly to the type thereof which embraces frictional gearing.

The primary object of the invention is to provide a device for the purpose of transmitting motion and power from a rotatable member of the device to another member; the motion of the latter being a rotation in the same direction, or in the opposite direction, to that of the first member and with the same period of rotation, or with a different period, as desired.

Another object of my invention is to eliminate, or reduce to a minimum, loss by friction in transmitting such motion and power.

The invention, in one aspect, resides in the aggroupment of stationary and traveling components so constructed and arranged relatively as to obviate in the preferred form of the device the employment of journals for the traveling components.

The invention, in another aspect, resides in the adaptation of an aggroupment of traveling components and the supporting of these relatively and correlatively that any predetermined speed change or reversal of the traveling components may readily be effected while the traveling instrumentalities are in motion, and this without danger of breakage or strain upon such traveling parts or upon the parts which support them. In addition, such change or reversal may be effected with a minimum of noise, jar, and the like.

The invention resides in a novel aggroupment of components including, on the one part, a series of rings, and on the other part, a series of rolling elements, these components being maintained in proper operative and frictional relation, and preferably without the employment of journals or bearing elements.

The invention also resides in novel means for controlling the speed of travel of the rotatable components, in conjunction with adjustable means for regulating the requisite friction between the several components, whereby they may be actuated at high or low velocity, these means being such as to permit the capability of adjustment which is essential at very high velocities, and also to adapt the rotatable components to be connected for operation with another member or members at a lower velocity.

I am aware that it has heretofore been proposed to utilize so-called "nest gearing", and the like, comprising circular wheels, or circular wheels and racks, including the reduplication of parts so arranged that the pressure required to produce adhesion by friction shall not cause pressure to be put on the bearings. My invention is in one of several aspects to be differentiated therefrom, in that the components, comprising the series of rings and rolling elements, preferably do not require journals or bearings to maintain them in operative and adjustable relation.

I am also aware that it has heretofore been proposed to provide motion-transmitting gearing consisting of means for adjustably supporting the rotating member of a motor and its shaft in such manner as to permit the rotation of these parts at a very high velocity with a minimum of sliding friction and with a capability of adjustment essential at high velocities, and wherein the rotating member and its shaft are adapted to be connected for operation with other parts operating at a lower velocity. My invention is distinguished therefrom, as will be clear from the disclosure hereinafter set forth.

My invention, therefore, consists in the novel parts, arrangements, combinations and improvements shown herein and described.

The accompanying drawings, referred to herein and constituting a part hereof, illustrate some of the possible embodiments of the invention, the same serving in connection with the description herein to explain the principles thereof.

Figure 14:
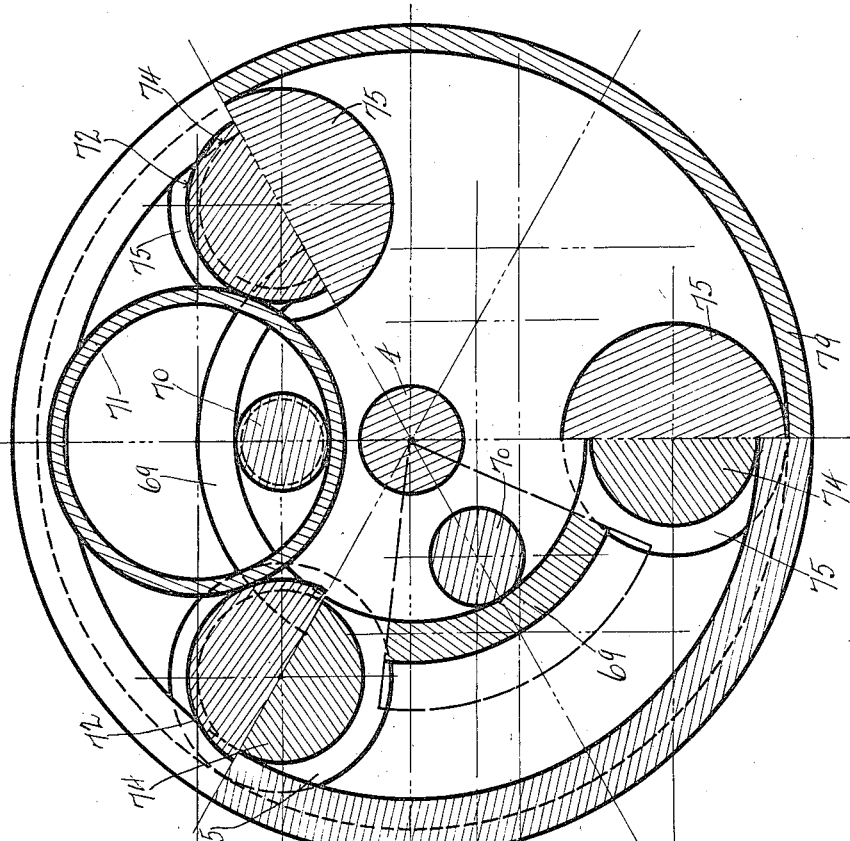
Figure 13:
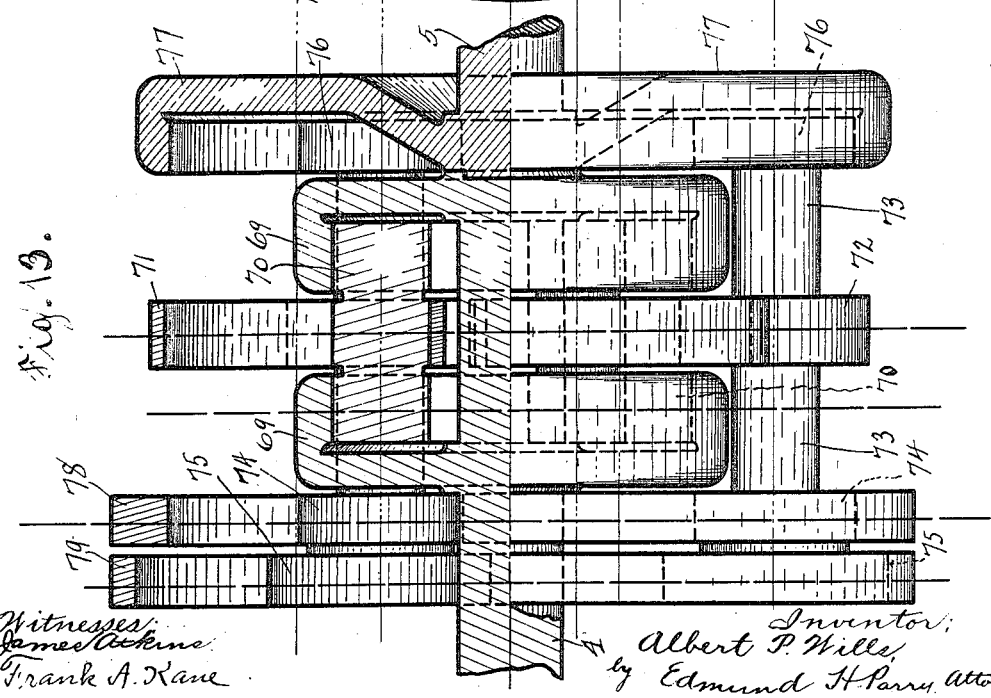

In these drawings: Figure 1 is a view in perspective—some of the parts being broken away somewhat—of a gearing-structure embodying my preferred form; Fig. 2 is a fragmentary view in vertical cross-section cut through either of the rings 7, Fig. 1; Fig. 3 is a similar view cut through the ring 11, Fig. 1; Fig. 4 is a similar view cut through a portion of the ring 17, Fig. 1; Fig. 5 is a similar view cut through a portion of the rings 27—29, Fig. 1; Fig. 6 is a view in longitudinal vertical section of another embodiment of the invention; Fig. 7 is a fragmentary view thereof, in end elevation; Fig. 8 is a fragmentary sectional view (on line 8—8, Fig. 6) showing, on a larger scale, track-rings, band-brakes for controlling the operation of some of the parts, and operating levers therefor; Fig. 9 is a fragmentary view, in elevation, illustrating one of the band-brakes utilized in controlling the operation of some of the parts; Fig. 10 is a fragmentary view in vertical cross-section on the line 10—10, Fig. 6; Fig. 11 is a similar view on the line 11—11, Fig. 6; Fig. 12 is a similar view on the line 12—12, Fig. 6; Fig. 13 is an elevational view, partly in section, of a somewhat different embodiment of my invention; Fig. 14 is a fragmentary view (partly in elevation and partly in section thereof); and Fig. 15 is a fragmentary view, in elevation, of a boat showing an application of my invention therein.

In the devices illustrated in the accompanying drawings as embodiments of the invention, the same are shown as including a frame, a series of rings and a series of rolls, said rings and the working rolls being so arranged correlatively as to present convex and concave surfaces in contacting relation; and in combination with these, a driving-member and a driven-member. According to certain features of the invention, it includes, in combination therewith, means for adjusting the rings and rolls relatively whereby predetermined normal pressures may be produced thereon. According to certain other features of the invention, and as shown in the illustrated embodiment, means are also provided for bringing into operation one or another set of the components whereby a reversal of rotation may be effected while said components are in motion. According to certain other features of the invention, means are provided for effecting a speed change of the components whereby any of a plurality of predetermined speeds may be produced. In so far as concerns certain aspects of the invention, it is immaterial how the driving-member is actuated, or with what the driven-member may be connected.

In the embodiment illustrated in Figs. 1-5, the structure is disclosed in its entirety, and preferably and as shown, includes a frame 1, which may be that illustrated, or any other of appropriate form and dimensions. The opposite ends of this frame are provided with bearings such as 3 in which drive and driven-shafts 4 and 5, respectively, are journaled, and which shafts, in this instance, respectively, constitute the driving and load-instrumentalities. Preferably and as shown, these driving and load-instrumentalities, 4 and 5, are arranged in co-axial relation, the one standing in mechanical connection with the other, either direct or indirect. Attached to the shaft 4, by means of appropriately formed spiders 6, 6, are two rings 7, 7, respectively, of similar form and construction. The inner surfaces of these rings constitute tracks upon which run a system of rolling-elements comprising (preferably and as shown) a plurality of rolls or rollers 8. The axes of these rolling-elements are parallel to the shaft 4, and, preferably and as shown, said rolling elements are flanged in order that they may more conveniently be maintained in tracking relation to the rings. As shown, there are for each of the rings a set or series of four rollers, though these may be in greater or less number, as desired. Each roller of the set on one of the tracks is preferably in rigid connection with a corresponding roller in the set on the other track. Any preferred means of connecting these may be employed; but, preferably and as shown, such connection should be rigid and in the form of a shaft 9. Suitable means are provided for pressing these rollers against the tracks; and in the present embodiment, said pressing means is adapted to force them radially outwardly from the axis of the shaft 4, and includes an intermediate system of rolls or rollers 10, the axes of which are likewise parallel to the shaft. The inward radial pressure upon these intermediate rolls is preferably effected by means of rings 11, 11, which, of course, are of a number corresponding to the sets of rollers 10, and which are contractile upon the familiar principle of the split-ring. These rings are adapted to ride on shafts 12 of said rolls 10. The shafts 12 are adapted to travel upon a sleeve 4ᵃ on the shaft 4, and which sleeve serves the function of centering the rolls 10, 10, with respect to said shaft 4. If it be desirable or necessary to space the roll-system, there may be employed any preferred instrumentality. In order to provide means for changing the speed of the load-instrumentality, there is provided, preferably and as shown, a system of traveling elements comprising, in this instance, a plurality of sets of rolls or rollers 14, 15 and 16, respectively, each mounted upon the several shafts 9, and each set being of varying diameter. The set of rollers 14 is encompassed by a contractile track-ring 17; similarly, the set of rollers 15 is encompassed by a contractile ring 18; and, similarly, the set of rollers 16 is encompassed by a contractile ring 19. These contractile rings 17, 18 and 19 are preferably of the split-ring type, and are adapted to be held fixed and against rotative movement by any appropriate means. In this instance, the same are shown as comprising band-brakes 20, 21 and 22, respectively. These three brakes are pivotally supported on links 20ª, 21ª and 22ª, mounted on a cross-rod 23, suitably supported in the frame 1. The respective brakes are operated by means of the handles 24, 25 and 26, respectively, which, in this instance, are shown as constituting an eccentric lever system. It will be understood that, by setting one or another of the brakes, its respective contractile track-ring will grip the proper set of the rollers 14, 15 or 16.

The foregoing constitutes the components of the structure which operate under the control of the driving-shaft 4. It is now in order to describe how the motion therefrom is transmitted to the driven-shaft 5.

Fast upon the shafts 9 is a system of rolling-elements comprising, in this instance, a plurality of rolls or rollers 27 and adapted to run on a track-ring 28 which, preferably and as shown, is of the split-ring type, and, in cross-section, is slightly tapered and adapted to fit into a correspondingly formed ring 29, the latter being threaded on its periphery to receive a correspondingly threaded member 30 formed as an annular part of a spider 31 which is adapted to be connected to the driven-shaft 5, as presently to be explained. By means of the threaded member 30, the track-ring 28 is caused to grip the rolls 27 with any desired or predetermined degree of pressure.

Any means for connecting the shaft 5, directly or indirectly, to the parts just described may be utilized. Preferably and as shown in this instance, such means may include a collar 32 which is adapted to have a sliding engagement with the shaft 5. The collar is provided with pins 33 that extend through holes 34 in the hub 31ª of the spider 31 into correspondingly formed holes (not shown) in the spider-hub 7ª of the ring-supporting spider 7, whereby direct mechanical connection between the shafts 4 and 5 may be established. If desirable to maintain the shafts 4 and 5 in proper alinement, the shaft 4 may be provided on its end with a boss 4ᵇ adapted to extend into a correspondingly formed recess 5ª formed in the proximate end of the shaft 5

Operation: It being understood that not more than one of the brakes is set at a time, and assuming that the shaft 4, which may extend from or connect with an electric or other form of motor, has been started, this shaft will simultaneously rotate the rings 7, 7, and these will set the whole roll-system into rotation about the axis of the shaft 4 and, at the same time, each shaft of the roll-system will also be set into rotation about its own axis, due to the tangential action upon the rolls of the particular track-ring which is held stationary by its brake. The pressure of the corresponding track-ring upon the rolls will be sufficient to prevent slipping. The rotations of the roll-system about the axis of the shaft 4 and of the rolls about their own axes would be of opposite sense as regards direction and the magnitudes of the corresponding angular velocities for a given speed of the shaft 4, depending upon which of the brakes 20, 21 or 22 is set. Assuming, now, that the several brakes 20, 21 and 22 have been released, and that the direct mechanical connection between the shafts 4 and 5 has been established, in the manner just described, the shaft 4, being in motion, will drive the shaft 5 directly. But, if such connection be not established, and if, by means of one or another of the brakes 20, 21 and 22, one or another of the track-rings 17, 18 or 19 is held fixed, the shaft 5 will be caused to rotate with the same angular velocity as the track-ring 28 with which it is in direct connection, such angular velocity of this ring depending, of course, upon which of the rings 17, 18 or 19 is held fixed.

It is to be understood that the dimensions of the various components of the machine may be so chosen as to give any desired or required velocity-ratio between the shafts 4 and 5, there being one such ratio corresponding to each of the rings 17, 18 and 19.

From the foregoing description, it will be evident how the device may be employed to transmit motion and power from a driving-instrumentality, directly connected to the shaft 4, to a device directly connected to the shaft 5; and, furthermore that, with a given speed or rotation furnished the shaft by the driving-instrumentality, various speeds of rotation may be given to the load-shaft, at the will of the operator.

Referring, now, to the embodiment illustrated in Figs. 6-12, it may be explained that the same differs from my preferred embodiment in certain respects, which will be apparent from the following: As in the preferred embodiment, the frame 1 is utilized, and in this the drive and load-shafts 4 and 5 are journaled. The shaft 4 carries two spider-supported rings 35, 35, constituting tracks upon each of which travels a set of rolls or rollers 36, 36, spaced as shown and corresponding rollers of each set being connected by a shaft 37. The rolls 36 are maintained in proper frictional engagement with their respective rings 35 by a system of intermediate rolls 38 having shafts 39 to connect corresponding rollers of each set; and each set of rollers travels in split-rings 40, precisely as described in connection with the preferred form of device. The shafts 39 travel upon a centering-element 39ª encircling the shaft 4, and which is adapted to maintain the rolls 38 in proper relation to the shaft 4. Similarly, and as in the preferred construction, the shafts 37, which connect the corresponding rollers 36 of each set, also have fast on them a series of horizontally alined rolls 41, 42 and 43 traveling in rings 44, 45 and 46, and any one of which rings may be brought into contact with its corresponding set of rolls by means of brake-mechanism similar to that already described in connection with my preferred form of structure, and which includes the band-brakes 47 and 48, respectively, operated by hand-levers 47ᵃ and 48ᵃ, respectively. The ring 46 is normally idle; that is to say, it is idle when the load-shaft 5 is running in the forward direction, but is active when running in the backward direction. In this instance, the shaft 4 is provided with a sleeve 49 which preferably has a running fit on the shaft and carries two journal-members 50 and 51 which are symmetrical about the shaft 4. Each of these members is provided with journals 52 and 53, respectively, which are adapted to have radial motion with respect to the members themselves toward and away from the shaft 4. The shafts 37 are adapted to rotate in these journals. Rigidly mounted on the sleeve 49 is a disk 54 in which are holes 55 which permit the shafts 37 of the rolls 36 and also the shafts 39 of the intermediate rolls 38 to extend therethrough and to have movement therein. The disk 54, adjacent its periphery, is adapted to be mechanically connected with the spider 56, and this in turn is mechanically connected to the load-shaft 5, by a controlling device clearly appearing in Figs. 8 and 9. This device has the function, also, of mechanically connecting the disk 54 to the frame of the machine and at the same time disconnecting said disk 54 from the spider 56 and establishing direct mechanical connection between the track-ring 46 and said spider 56; so that, when this is done, the rotation of the roll-system as a whole will be prevented. Obviously, in connection with this construction, there may be provided a device by which direct connection between the driving-shaft 4 and the load-shaft 5 might be established, precisely in the same manner as described in connection with my preferred form. This controlling-device, as clearly shown in Fig. 8, includes a disk or ring 57 arranged concentrically on the drive-shaft 4 and carrying projections or pins 58 and 59 disposed adjacent the periphery of the ring 57. The pins 58 extend into holes or recesses 60 in the ring 54 so that, when direct mechanical connection between said ring 57 and the spider 56 is established, said pins will extend into corresponding holes 61 in the rim of said spider. The ring 57 is adapted to have movement in relation to the disk 54 and means are provided for positioning said ring toward and away from the same and, thereby, to seat the pins 58 into or withdraw them from the recesses 60. Such means preferably include a lever 57ᵃ pivoted on the frame 1 of the machine and arranged for movement by the operator. To facilitate the movement of these parts, a spring 62, disposed in a bore 63 in the spider 56, is provided, and which acts upon a sliding pin 64 that abuts against the inner end of the pin 58. By these instrumentalities, the ring 57 may be disconnected from the spider 56 and connected to the frame of the machine, this latter result being accomplished when the pins 59 also carried by the ring 57 are seated in the holes or recesses 64ᵃ formed in the frame 1 of the machine. When thus positioned, the ring 57 is prevented from having rotation. Approximately simultaneously with this movement, hook-formed extensions 66 of the pins 64 will, in moving toward the left (Fig. 8), enter correspondingly formed incuts 67 and 68 formed respectively in the spider 56 and in the periphery of the track-ring 46, whereby a direct mechanical connection between said track-ring 46 and the spider 56 is effected.

Operation: Assuming that one or the other of the brakes 47, 48, is set—in this instance, say, the brake 47—so that the corresponding track-ring 44 is held stationary, and assuming, also, that the lever 57ᵃ is so positioned that direct mechanical connection is established between the disk 54 and the spider 56, it will be understood that, when the drive-shaft 4 begins to rotate and reaches a predetermined speed, rotation of the rolls 36 is initiated and these move, as a roll-system, about the shaft 4; and, moreover, each of said rolls 36 will itself be set in rotation about its own axis through the tangential action of their respective track-rings 35, which rotate with the shaft 4. The sleeve 49 is forced to rotate about the shaft 4 with the same angular velocity as that impressed upon the roll-system about the same axis, for the reason that the journal-members 50 (carrying the journals of the shafts 37 and of the rolls 36) and also because said members 50 are in rigid connection with the sleeve 49. As the ring 57 is also in rigid connection with the sleeve 49, and since this ring is also in rigid connection with the load-shaft 5 through the spider 56, it follows that said shaft will rotate with the same angular velocity as the roll-system about the common axis of the drive-shaft 4 and the load-shaft 5. Obviously, this velocity will be different if, for instance, the brake 48 is set instead of the brake 47. Now, supposing that both brakes 47 and 48 are released so that the corresponding rings 44 and 45 become idle, and that the lever 57ᵃ is so positioned that the ring 57 is held stationary, and that, thus, direct mechanical connection is established between said ring 57 and the spider 56, it will be manifest that, upon rotation of the shaft 4 being effected, there will be no rotation of the roll-system, as a whole, about the shaft 4, because the members 51 and 52 (which carry the journals of the shafts 37 of the rolls 36) are held stationary. But the track-rings 35, through their tangential action upon the rolls 36, will cause the latter to rotate about their own axes; and, through the direct mechanical connection of the shafts 37 with the rolls 36 and with the rolls 43, the latter will be forced to rotate with the same angular velocity as the rolls 36. The corresponding track-ring 46 will, through the tangential action of said rolls 43 upon it, be set into rotation about the shaft 4, and since the shaft 5 will then be in direct mechanical connection with the track-ring 46 through the spider 56, it will also rotate with the same angular velocity as said ring 46, and the direction of rotation will be opposite to that which occurred when the lever 57ª was adjusted in the example first assumed. Obviously, in this embodiment, the same as in my preferred embodiment, by increasing the number of the rolls 44, 45 and 46 and the corresponding track-rings, brakes, etc., a great variety of speeds, direct and reverse, may be obtained and be under the control of the operator.

In the embodiment disclosed in Figs. 13 and 14, there is secured to the drive-shaft 4 two spaced track-rings 69, 69, adapted to be traversed by a plurality of rollers 70, which are adapted to drive rings 71, the latter contacting at their peripheries with rolls 72, mounted on shafts 73, which carry, at one end, rolls 74, 75, and at the other end a roll 76. The latter roll tracks on load-ring 77 which is mounted on the load-shaft 5. The rolls 74 track on ring 78 and the rolls 75 track on ring 79, the latter being of the split-ring type and operated by brake-mechanism similar to that already described in connection with the rings 17—19.

Operation: The operation of this form of structure is similar to that already described and shown in the embodiments illustrated in Figs. 1—6.

In Fig. 15, I have shown the application of my invention to a boat, designated generally by the reference-character A which is propelled by a gas-engine B as a source of power. My friction-gearing, designated generally by the reference-character C, is shown coupled at the high-speed end to the shaft D of the gas-engine and at the low-speed end of the shaft E of the propeller. Through the operation of one or another of the different levers F, G and H, different speed of rotation of the propeller, both direct and reverse, may be obtained, all as will be clear from what has already been explained hereinabove.

From the foregoing, it will be understood that my invention contemplates the provision of means by which, in friction-gearing, it is possible to secure at all contacting surfaces through which power is transmitted that the centers of curvature of the contacting-surfaces at any point of contact shall lie on the same side of the tangential plane of contact at this point; and, to this end, that the same resides in a structure which includes a plurality of rolls and rings so arranged and aggrouped that at all contacting surfaces the motion of one of the contacting elements relatively to the other is one specifically of rolling; and that this structure includes, also, brake-mechanism whereby, by setting one of a plurality of brake-devices, one of the rings may be held fixed and made to act upon the roll-system so as to cause said system to rotate about the drive-shaft with an angular velocity which depends upon which one of the brake-devices is set and, also, that the rotation communicated to the load-shaft may be in the same direction or in the opposite direction to that of the drive-shaft; and that the invention contemplates, also, means for producing any desired normal pressure at the contacting surfaces of the rolls and rings. It will also be understood that the various parts and devices, singly and in their coöperation and coöperative relation, contribute to effect a controllable and predetermined variable speed or rotation of a load-instrumentality; and that a structure has thus been provided which realizes the objects of the invention and advantages which flow from the employment of such an improved form of friction-gearing.

The invention in its broader aspects is not limited to the particular constructions shown, nor to any particular construction by which it has been or by which it may be carried into effect, since many changes may be made in the structure without departing from the main principles of the invention and without sacrificing any of its chief advantages.

What I claim as new and desire to secure by Letters-Patent is:—

1. A gearing-structure including a rolling-instrumentality, means for producing tangential driving action thereon including an instrumentality having a surface adapted to be traversed by said rolling-instrumentality and having its center of curvature and that of the rolling-instrumentality on the same side of the tangential plane of contact, and means operating upon one of said instrumentalities to effect a change of speed.

2. A gearing-structure including a plurality of rolling-instrumentalities, means for producing tangential driving action thereon including an instrumentality having a surface adapted to be traversed by said rolling-instrumentalities, its center of curvature and that of each of the rolling-instrumentalities being on the same side of the tangential plane of contact, and means operating upon one of said instrumentalities to effect a change of speed.

3. A gearing-structure including a drive-instrumentality, a plurality of rolling-instrumentalities supported independent of journals, and means for producing tangential driving action on said rolling-instrumentalities, said means having a curved surface adapted to be traversed by said rolling-instrumentalities its center of curvature and that of each of the rolling-instrumentalities being on the same side of the tangential plane of contact, said rolling-instrumentalities being rotative around said drive-instrumentality and on their own axes.

4. A gearing-structure including a drive-instrumentality provided with a plurality of spaced annular elements, and rolling-instrumentalities, said elements having contact surfaces adapted to produce tangential action on said rolling-instrumentalities, their centers of curvature and those of each of the rolling-instrumentalities being on the same side of the corresponding tangential plane of contact.

5. A gearing structure including a primary instrumentality, a secondary instrumentality, a plurality of roll-retaining instrumentalities, rolling instrumentalities some of which contact with the primary instrumentality and some with the secondary instrumentality, and means for producing motion specifically of rolling at all surfaces touched by each of the rolling instrumentalities.

6. A gearing-structure including a drive-instrumentality, a frictional speed-changing gearing for supporting the instrumentality and transmitting its motion to a load-instrumentality and including rolling elements, means for sustaining and controlling the components of said gearing whereby a motion specifically of rolling is secured at all contacting surfaces of said rolling elements, and means operating on certain of said elements to effect a change of speed.

7. A gearing-structure, including a plurality of annular members, and a plurality of rolling-elements supported independently of journals and so disposed in relation to said annular members and to each other that at all contacting surfaces the motion of one of the contacting elements relatively to the other is one specifically of rolling.

8. A gearing-structure, including a plurality of rings, a plurality of sets of rolling-elements some of which travel on rings while others travel upon other of said rolling-elements, a driving-member adapted to rotate on its own axis and thereby effect a rotation about such axis of said rolling-elements and, also, a rotation of said elements on their own axes, and means operating on some of said elements whereby a motion specifically of rolling is produced at all surfaces touched by each of the rolling elements.

9. A gearing-structure, including a plurality of rings, a plurality of sets of rolling-elements some of which travel on rings while others travel upon other of said rolling-elements, a driving-member adapted to rotate on its own axis and thereby effect a rotation about such axis of said rolling-elements and, also, a rotation of said elements on their own axes, and means for maintaining said rings and rolling-elements in frictional contact independent of journals.

10. A gearing-structure, including a plurality of rings, a plurality of sets of rolling-elements some of which travel on rings while others travel upon others of said rolling-elements, a driving-member surrounding the axes of said rolling-elements and adapted to rotate on its own axis and thereby effect a rotation about such axis of said rolling-elements and, also, a rotation of said elements on their own axes, and means for pressing certain of said rolling-elements toward the driving-member and operating, thus, to increase the frictional contact of said elements with their rings and with the driving-member.

11. A gearing-structure, including a plurality of rings, a plurality of sets of rolling-elements some of which travel on rings while others travel upon others of said rolling-elements, a driving-member adapted to rotate on its own axis and thereby effect a rotation about such axis of said rolling-elements and, also, a rotation of said elements on their own axes, and a series of speed-change devices operable to vary the speed of rotation of said rolling-elements about the axis of the driving-member and on their own axes.

12. A gearing-structure, including a plurality of rings, a plurality of sets of rolling-elements some of which travel on rings while others travel upon others of said rolling-elements, a driving-member adapted to rotate on its own axis and thereby effect a rotation about such axis of said rolling-elements and, also, a rotation of said elements on their own axes, a series of speed-change devices operable to vary the speed of rotation of said rolling-elements about the axis of the driving-member and on their own axes, and means operating upon at least one of said elements whereby reversal of the direction of travel of one of said rings is effected.

13. A gearing-structure, including a frame, drive and load instrumentalities journaled therein, a plurality of rings encompassing one of said instrumentalities, a plurality of sets of rolling-elements, certain of which travel on said rings while others travel on those that travel on the rings, means for maintaining said rolling-elements in operative relation with each other and with said rings whereby they may rotate on their axes and about the axis of one of said instrumentalities, and means operative at the will of the operator to control the speed of said rolling-elements whereby the direction of rotation and speed of said load-instrumentality may be positively controlled.

14. A gearing-structure including a motor-shaft, a load-shaft, a frictional speed-changing gearing for supporting the motor-shaft and for transmitting motion to said load-shaft and comprising as components a plurality of track-rings, a plurality of sets of power-transmitting rolling-elements, and power-transmitting means connecting the rolling-elements with the motor-shaft and with the load-shaft independent of surfaces in external contact transmitting power through frictional action, said rolling-elements receiving motion from said motor-shaft to effect their rotation as a revolving mass about the axis of said motor-shaft and to effect their rotation on their individual axes.

15. A gearing-structure, including as components a series of rings and rolling-elements aggrouped so that concave and convex surfaces are in frictional contact at all driving-surfaces, and a drive-instrumentality adapted to set said components as a mass into rotative motion about its axis and also to rotate certain of the components on their own axes.

16. A gearing-structure, including a drive-instrumentality, a load-instrumentality, a plurality of annular members, a roll-system comprising a plurality of rolling-elements so aggrouped as to roll upon said annular members and upon one another, and brake-mechanism including a plurality of brake-devices whereby, by setting one of said devices, one of the annular members may be held fixed and caused to act upon the roll-system so as to cause said system to rotate about the axis of the drive-instrumentality with an angular velocity which depends upon which one of said brake-devices is set, and whereby also the rotation communicated to the load-instrumentality may be in the same direction, or in the opposite direction, to that of the drive-instrumentality.

17. A gearing-structure including a drive-instrumentality, a plurality of annular members, a roll-system comprising a plurality of rolling-elements so aggrouped as to roll upon said annular members and upon one another, brake-mechanism including a plurality of brake-devices whereby, by setting one of said devices, one of the annular members may be held fixed and caused to act upon the roll-system so as to cause said system to rotate about the axis of the drive-instrumentality with an angular velocity which depends upon which one of said brake-devices is set, and whereby also the rotation communicated to the load-instrumentality may be in the same direction, or in the opposite direction, to that of the drive-instrumentality, and means for varying the normal pressure at the contacting surfaces of said annular members and rolling-elements.

18. A gearing-structure including a roll-system comprising a plurality of rolling-elements, a plurality of rings, certain of which are spaced and ride upon said rolling-elements, a load-instrumentality actuated by said rolling-elements between the spaced rings and with which certain of the rolling elements contact, and a drive-instrumentality having contacting relation to the roll-system adjacent the ends thereof, and means for producing motion specifically of rolling at all surfaces touched by each of the rolling elements.

19. A gearing-structure including a frame, drive and load instrumentalities journaled therein, a ring-device fast on the drive-instrumentality, a ring fast on the load-instrumentality, a plurality of rings interposed between the rings carried by the drive and load instrumentalities, a roll-system revolving within the rings whereby motion is transmitted from the drive-instrumentality to the load-instrumentality, and means for causing said roll-system to rotate about the axis of the drive-instrumentality at a predetermined angular velocity and also to effect rotation of the rolling components of said system about their own axes.

20. A gearing-structure including a frame, drive and load instrumentalities journaled therein, a ring-device fast on the drive-instrumentality, a ring fast on the load-instrumentality, a plurality of rings interposed between the rings carried by the drive and load-instrumentalities, a roll-system revolving within the rings whereby motion is transmitted from the drive-instrumentality to the load-instrumentality, means for causing said roll-system to rotate about the axis of the drive-instrumentality at a predetermined angular velocity and also to effect rotation of the rolling components of said system on their own axes, and a plurality of brake-devices encompassing said roll-system and including means for operating one or another of said brake-devices to change the angular velocity of rotation of the rolling components of the system.

21. A gearing-structure including a frame, load and drive shafts journaled therein, ring components fast on the drive-shaft, a ring component fast on the load-shaft and spaced from said drive-shaft-rings, a plurality of ring components independent of said drive and load-shafts, a roll-system adapted to rotate within the ring components about the axis of said drive-shaft and on their own axes, and means for changing the angular velocity of rotation of said roll-system.

22. A gearing-structure including a frame, drive and load shafts journaled therein, a pair of spaced rings fast on said drive-shaft, a ring fast on said load-shaft and occupying a position between said pair of drive-shaft-rings, a pair of rings occupying a position between said drive-shaft-rings, a roll-system adapted to traverse said rings and to rotate about the axis of said drive-shaft at a predetermined angular velocity, shafts extending between sets of rolls forming said roll-system and contacting with said aforementioned pair of independent rings, and means contacting with said roll-system and adapted to change the angular velocity of said roll-system around said drive-shaft.

23. A gearing-structure including a frame, drive and load shafts journaled therein, a pair of spaced rings fast on said drive-shaft, a ring fast on said load-shaft and occupying a position between said pair of drive-shaft-rings, a pair of rings occupying a position between said drive-shaft-rings, a roll-system adapted to traverse said rings and to rotate about the axis of said drive-shaft at a predetermined angular velocity, shafts extending between sets of rolls forming said roll-system and contacting with said aforementioned pair of independent rings, means contacting with said roll-system and adapted to change the angular velocity of said roll-system about the axis of said driveshaft, and means for varying the normal pressure at the contacting surfaces of said rolls and rings.

24. A gearing structure including a rolling instrumentality supported independently of journals, and means for producing tangential driving action thereon including an instrumentality having a surface adapted to be traversed by said rolling instrumentality, its center of curvature and that of the rolling instrumentality being on the same side of the tangential plane of contact.

25. A gearing structure including a plurality of rolling instrumentalities unsupported by journals, and means for producing a tangential driving action thereon including an instrumentality also unsupported by journals and having a surface adapted to be traversed by said rolling instrumentalities. its center of curvature and that of each of the rolling instrumentalities being on the same side of the tangenial plane of contact.

26. A gearing structure including a plurality of roll-retaining instrumentalities, contacting rolling instrumentalities, means for producing motion specifically of rolling at all surfaces touched by each of the rolling instrumentalities, and means for changing the relative motion between the roll-retaining instrumentalities and the contacting rolling instrumentalities.

27. A structure including a plurality of roll-retaining instrumentalities, rolling instrumentalities some of which are adapted to track on certain of said roll-retaining instrumentalities while others track upon others of the roll-retaining instrumentalities and upon others of the rolling instrumentalities, the roll-retaining instrumentalities being correlatively arranged to present convex and concave surfaces in contacting relation.

28. A structure including a plurality of annular members, and a plurality of rolling elements some of which are adapted to track upon certain of the annular members while others are adapted to track upon others of the annular members and upon others of the rolling elements, said member-contacting rolling elements and said annular members being so disposed correlatively as to present convex and concave surfaces in contacting relation so that at all contacting surfaces the motion of one of the contacting elements relatively to the other is one specifically of rolling.

29. The combination of a primary element, a secondary element, a plurality of rolling elements adapted to track on said primary element, and a plurality of rolling elements adapted to track on said secondary element and on others of said rolling elements, said primary and secondary elements and their contacting rolling elements being correlatively arranged to present only convex and concave surfaces in contacting relation.

30. The combination of a primary annular element, a secondary annular element, a plurality of rolling elements adapted to track on said primary element, and a plurality of rolling elements adapted to track on said secondary element and on others of said rolling elements, said annular elements and their contacting rolling elements being correlatively arranged to present convex and concave surfaces in contacting relation.

31. The combination of a plurality of primary annular elements, a secondary annular element, a plurality of rolling elements adapted to track on said plurality of primary elements, and a plurality of rolling elements adapted to track on said secondary element and on others of the rolling elements, said annular elements and their contacting rolling elements being correlatively arranged to present convex and concave surfaces in contacting relation.

32. A gearing structure including a plurality of primary rings, a secondary ring, a plurality of rolling elements adapted to track on said plurality of primary rings, a plurality of rolling elements adapted to track on said secondary ring and on others of said rolling elements, said rings and their contacting rolling elements being correlatively arranged to present convex and concave surfaces in contacting relation, and speed changing means operable on certain of said elements to effect a change of speed thereof.

33. The combination of a plurality of primary annular elements, a secondary annular element, a plurality of rolling elements adapted to track on said primary elements, a plurality of rolling elements adapted to track on said secondary element, said annular elements and their contacting rolling elements being correlatively arranged to present convex and concave surfaces in contacting relation, and means for maintaining certain of said elements in spaced relation.

34. The combination of a primary annular element, a secondary annular element, a plurality of rolling elements adapted to track on said primary element, a plurality of rollings elements adapted to track on said secondary element, said annular elements and their contacting rolling elements being correlatively arranged to present convex and concave surfaces in contacting relation, means for maintaining certain of said elements in spaced relation, and means acting on certain of the rolling elements to force them toward the axis of the primary element and thereby effect a movement of others of the rolling elements away from said axis.

35. A gearing structure including a primary instrumentality, a secondary instrumentality, a plurality of power and motion-transmitting elements comprising encompassing elements at least one of which is deformable to act on certain of said motion elements to maintain said elements in operative relationship to effect the transmission of motion and energy, and means for subjecting an encompassing element to external control to vary the velocity ratio between the primary and secondary instrumentalities.

36. A structure of the kind described including a prime mover, a secondary instrumentality, a plurality of power and motion-transmitting elements comprising encompassing elements at least one of which is deformable to act on certain of said motion elements to maintain said elements in operative relation to effect the transmission of motion and energy, and an independent encompassing instrumentality adapted to act upon at least one of said elements to control the same and thereby to control the action of said power and motion-transmitting elements.

37. A gearing structure including a drive instrumentality, a load instrumentality, a plurality of power and motion-transmitting elements interposed between said primary and secondary instrumentalities and comprising encompassing elements at least one of which is deformable to act on certain of said motion elements to maintain said elements in operative relationship to effect the transmission of motion and energy, and brake mechanism including a plurality of components whereby, by setting one of them, one of the encompassing elements may be held fixed and caused to act upon said rolling elements so as to cause the same to rotate about the axis of the drive instrumentality with an angular velocity which depends upon which one of said components is set and whereby also the rotation communicated to the load instrumentality may be in the same direction or in the opposite direction to that of the drive instrumentality.

38. A gearing structure including a drive instrumentality; a load instrumentality; a pair of annular elements carried by the drive instrumentality; a series of rolling elements tracking on said annular elements; a second set of annular elements juxtaposed to said drive-carrying annular elements; a set of rolling elements tracking thereon and also upon said other rolling elements, and a deformable encompassing element acting on certain of said rolling elements to maintain the elements in operative relationship to effect the transmission of motion and energy.

39. A gearing structure including a drive instrumentality; a load instrumentality; a pair of annular elements carried by the drive instrumentality; a series of rolling elements tracking on said annular elements; a second set of annular elements juxtaposed to said drive-carried annular elements; a set of rolling elements tracking thereon and also upon said other rolling elements; a deformable encompassing element acting on certain of said rolling elements to maintain the elements in operative relationship to effect the transmission of motion and energy, and a plurality of encompassing brake elements operable upon certain of said rolling elements to control the speed and direction of rotation of said load instrumentality.

40. A gearing structure including a drive instrumentality; a load instrumentality; a pair of annular elements carried by the drive instrumentality; a series of rolling elements tracking on said annular elements; a second set of annular elements juxtaposed to said drive-carrying annular elements; a set of rolling elements tracking thereon and also upon said other rolling elements; a deformable encompassing element acting on certain of said rolling elements to maintain the elements in operative relationship to effect the transmission of motion and energy; a plurality of encompassing brake elements operable upon certain of said rolling elements to control the speed and direction of rotation of said load instrumentality, and means for maintaining certain of said rolling elements in spaced relation.

41. A gearing structure including a primary element, a secondary element, and rolling instrumentalities some of which are in contact with each other and some of which are in frictional driving contact with an internal surface of at least one of said elements and some of which are rotatable as a mass about the axis of one of said elements whereby centrifugal action of the rolling instrumentalities, due to such rotation about the axis of said element, at all contacting surfaces where frictional driving is present acts to increase the normal pressure between all such surfaces.

42. A gearing structure including a primary element, a secondary element, and rolling elements; some of the rolling elements contacting with an internal surface of the primary element and with others of the rolling elements and some of the contacting elements being in frictional driving contact and some of the rolling elements being rotatable as a mass about the axis of the primary element whereby centrifugal action of the rolling elements, due to such rotation as a mass about the axis of the primary element, at all contacting surfaces where frictional driving is present acts to increase the normal pressure between all such surfaces.

43. A gearing structure including a primary instrumentality, a secondary instrumentality, an externally-controlled annular member, power-transmitting rolling-elements tracking on said annular member, and power-transmitting means connecting the rolling-elements with the primary instrumentality and with said secondary instrumentality independent of surfaces in external contact transmitting power through frictional action.

44. A gearing structure including a primary instrumentality, a secondary instrumentality, a plurality of roll-retaining instrumentalities, and rolling instrumentalities, some of which roll upon the primary instrumentality, the surfaces of those rolling upon said primary instrumentality being all in contact with an internal surface thereof.

45. A gearing structure including a driven instrumentality, a driving instrumentality, rolling instrumentalities, and a reaction instrumentality upon which certain of the rolling instrumentalities track, said instrumentalities being in contacting relation and at certain of such contacting surfaces frictional driving being effected and at all of such frictional driving surfaces one of the contacting members encircling the other.

46. A gearing structure including a driven instrumentality, a driving instrumentality, rolling instrumentalities, and a track instrumentality encompassing said rolling instrumentalities, said instrumentalities being in contacting relation and at certain of such contacting surfaces frictional driving being effected and at all of such frictional driving surfaces one of the contacting members encircling the other.

In testimony whereof I affix my signature in presence of two witnesses.

ALBERT P. WILLS.

Witnesses:
EDMUND H. PARRY,
A. M. PARKINS.